(12) United States Patent
Nakamura et al.

(10) Patent No.: US 9,787,242 B2
(45) Date of Patent: Oct. 10, 2017

(54) MOTOR CONTROL DEVICE FOR CONTROLLING MOTOR IN DEPENDENCE ON MOTOR'S TEMPERATURE AND SHEET CONVEYING DEVICE

(71) Applicant: BROTHER KOGYO KABUSHIKI KAISHA, Nagoya-shi, Aichi-ken (JP)

(72) Inventors: Kazutoshi Nakamura, Kuwana (JP); Masanori Hamaguchi, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 156 days.

(21) Appl. No.: 14/944,525

(22) Filed: Nov. 18, 2015

(65) Prior Publication Data

US 2016/0156300 A1    Jun. 2, 2016

(30) Foreign Application Priority Data

Nov. 28, 2014 (JP) ................. 2014-241428

(51) Int. Cl.
*H02P 29/00* (2016.01)
*B65H 7/20* (2006.01)
*H02P 29/60* (2016.01)

(52) U.S. Cl.
CPC ........... *H02P 29/0044* (2013.01); *B65H 7/20* (2013.01); *H02P 29/60* (2016.02)

(58) Field of Classification Search
CPC .................................. H02P 29/0044
USPC .................... 318/473, 471, 445
See application file for complete search history.

(56) References Cited

U.S. PATENT DOCUMENTS

| | | | |
|---|---|---|---|
| 4,616,324 A | 10/1986 | Simmel | |
| 5,123,081 A | 6/1992 | Bachman et al. | |
| 5,168,415 A | 12/1992 | Osuga | |
| 5,283,708 A | 2/1994 | Waltz | |
| 5,418,677 A | 5/1995 | Engel | |
| 5,644,510 A | 7/1997 | Weir | |
| 5,838,591 A | 11/1998 | Yamaguchi | |
| 7,151,348 B1 * | 12/2006 | Ueda ............... | F04B 35/045 310/12.19 |
| 2007/0001642 A1 | 1/2007 | Yoshihisa | |

FOREIGN PATENT DOCUMENTS

| | | |
|---|---|---|
| JP | 10-14096 A | 1/1998 |
| JP | 2006-352940 A | 12/2006 |
| JP | 2008-079423 A | 4/2008 |

* cited by examiner

*Primary Examiner* — David S Luo
(74) *Attorney, Agent, or Firm* — Merchant & Gould P.C.

(57) ABSTRACT

Temperature-dependent motor control device, including: a motor controller configured to switch a motor control state among an activated state in which the motor is activated by a first current, an activation stopped state in which activation of the motor is stopped by stopping current supply, and an activation suspended state in which activation of the motor is suspended with a second current smaller than the first current kept supplied; and a temperature estimator configured to calculate an estimated motor temperature value and to perform a first calculation for gradually increasing the estimated value when the motor is in the activated state, a second calculation for gradually decreasing the estimated value when the motor is in the activation stopped state, and a third calculation for gradually decreasing the estimated value at a rate of decrease lower than that in the second calculation when the motor is in the activation suspended state.

7 Claims, 4 Drawing Sheets

MOTOR CONTROL DEVICE FOR CONTROLLING MOTOR IN DEPENDENCE ON MOTOR'S TEMPERATURE AND SHEET CONVEYING DEVICE

CROSS REFERENCE TO RELATED APPLICATION

The present application claims priority from Japanese Patent Application No. 2014-241428, which was filed on Nov. 28, 2014, the disclosure of which is herein incorporated by reference in its entirety.

BACKGROUND

Technical Field

The following disclosure relates to a motor control device for controlling a motor in dependence on a temperature of the motor and a sheet conveying device.

Description of the Related Art

There are known devices having a conveying mechanism configured to convey a document to be read and a recording medium. (The document and the recording medium hereinafter simply referred to as "sheet" where appropriate.) In such devices, a temperature of a motor as a power source of the conveying mechanism is estimated, and the motor is controlled such that a value corresponding to the estimated temperature does not become excessively large.

SUMMARY

In the devices described above, the motor is stopped by temporarily prohibiting a current supply to the motor when the value θ corresponding to the estimated temperature becomes equal to or larger than an upper limit value θmax. If the sheet being conveyed is kept held in the conveying mechanism that is temporarily stopped in an instance where the motor is in the activation stopped state according to the technique described above, tension of the sheet acts on various portions of the conveying mechanism, and a part of the tension is sometimes transmitted to the motor via the conveying mechanism.

When such tension is transmitted to the motor, a rotor of the motor is somewhat rotated by the tension, causing a risk of a phase shift of the motor. In an instance where such a phase shift is excessively larger than expected, the motor may suffer from a loss of synchronization when the motor is again activated after a decrease in the estimated temperature.

As a technique of preventing such a phase shift of the motor, it is generally known to place the motor in a weakly energized state by supplying a weak current thereto even in a state in which the motor is stopped and to thereby hold the rotor of the motor in place.

However, if the control of completely prohibiting the current supply to the motor is only merely replaced with the control of supplying a weak current to the motor, there may arise the following problem. That is, power consumption in the state in which the motor is stopped becomes larger when a weak current is supplied to the motor than when the current supply to the motor is completely prohibited. Further, the temperature of the motor is less likely to be lowered when a weak current is supplied to the motor than when the current supply is completely prohibited. It thus takes a longer time to re-activate the motor when a weak current is supplied to the motor than when the current supply is completely prohibited. Moreover, a time required for the temperature of the motor to reach an upper limit upon reactivation of the motor becomes shorter when a weak current is supplied to the motor. In any event, the operability of the device is impaired.

In view of the situations described above, it is desirable to provide a motor control device for controlling a motor in dependence on a temperature of the motor and a sheet conveying device that can achieve, in good balance, prevention of a phase shift of the motor when activation of the motor is suspended and good operability of the device.

In one aspect of the disclosure, a motor control device for controlling a motor in dependence on a temperature of the motor includes: a motor controller configured to switch a control state of the motor among a plurality of control states including at least (a) an activated state in which the motor is activated by supplying thereto a first current, (b) an activation stopped state in which activation of the motor is stopped by stopping a current from being supplied to the motor, and (c) an activation suspended state in which activation of the motor is suspended with a second current kept supplied to the motor, the second current being smaller than the first current; and a temperature estimator configured to calculate an estimated value of the temperature of the motor that changes with time, wherein the temperature estimator is configured to perform (1) a first calculation for gradually increasing the estimated value with time in a time period during which the motor is in the activated state, (2) a second calculation for gradually decreasing the estimated value with time in a time period during which the motor is in the activation stopped state, and (3) a third calculation for gradually decreasing the estimated value with time at a rate of decrease lower than that in the second calculation in a time period during which the motor is in the activation suspended state.

In another aspect of the disclosure, a sheet conveying device includes: a conveying unit configured to convey a sheet along a conveyance path; a motor configured to operate the conveying unit; a motor controller configured to switch a control state of the motor among a plurality of control states including at least (a) an activated state in which the motor is activated by supplying thereto a first current, (b) an activation stopped state in which activation of the motor is stopped by stopping a current from being supplied to the motor, and (c) an activation suspended state in which activation of the motor is suspended with a second current kept supplied to the motor, the second current being smaller than the first current; and a temperature estimator configured to calculate an estimated value of the temperature of the motor that changes with time, wherein the temperature estimator is configured to perform (1) a first calculation for gradually increasing the estimated value with time in a time period during which the motor is in the activated state, (2) a second calculation for gradually decreasing the estimated value with time in a time period during which the motor is in the activation stopped state, and (3) a third calculation for gradually decreasing the estimated value with time at a rate of decrease lower than that in the second calculation in a time period during which the motor is in the activation suspended state.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

There will be hereinafter explained a motor control device for controlling a motor in dependence on a temperature of the motor and a sheet conveying device according to one embodiment.

1. Configuration of MFP

Figure 1:
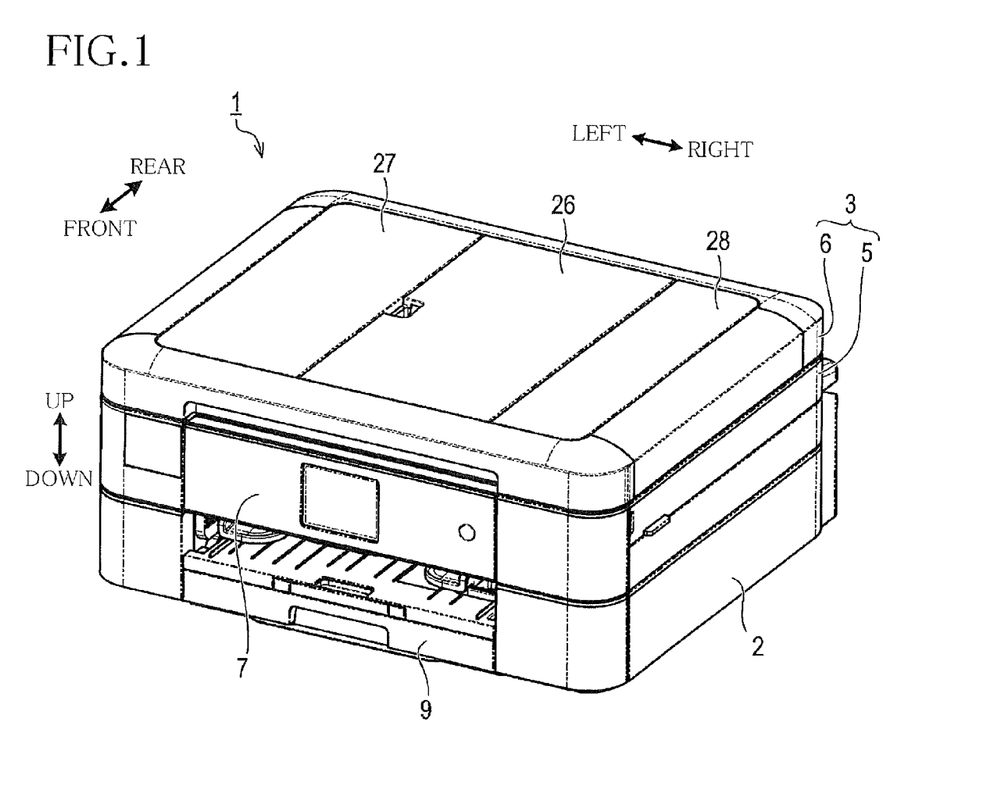
FIG. 1 is a perspective view showing an external appearance of an entirety of a multifunction peripheral (MFP)

A multi-functional peripheral (MFP) 1 shown in FIG. 1 has a configuration corresponding to one example of the motor control device and the sheet conveying device described above. For easy understanding of a relative positional relationship of components of the MFP 1, an up-down direction is defined as a direction orthogonal to the horizontal plane in a case where the MFP 1 is placed on the horizontal plane. A frontward direction is defined as a direction in which an operation panel 7 (described below) is oriented. A rearward direction is defined as a direction opposite to the frontward direction. A right-left direction is defined as a right-left direction in a case where the MFP 1 is viewed from a front side thereof. It is noted that orientations of movable components may be changed and directions indicated in the drawings are not always maintained.

As shown in FIG. 1, the MFP 1 includes a main body unit 2 and a reading unit 3 disposed on the main body unit 2. The reading unit 3 includes a scanner unit 5 and an ADF unit 6 (as one example of the sheet conveying device) disposed on the scanner unit 5. The operation panel 7 is provided on a front surface of the main body unit 2. A medium supply cassette 9 for storing the recording media is attached to the main body unit 2 below the operation panel 7.

Figure 2A:
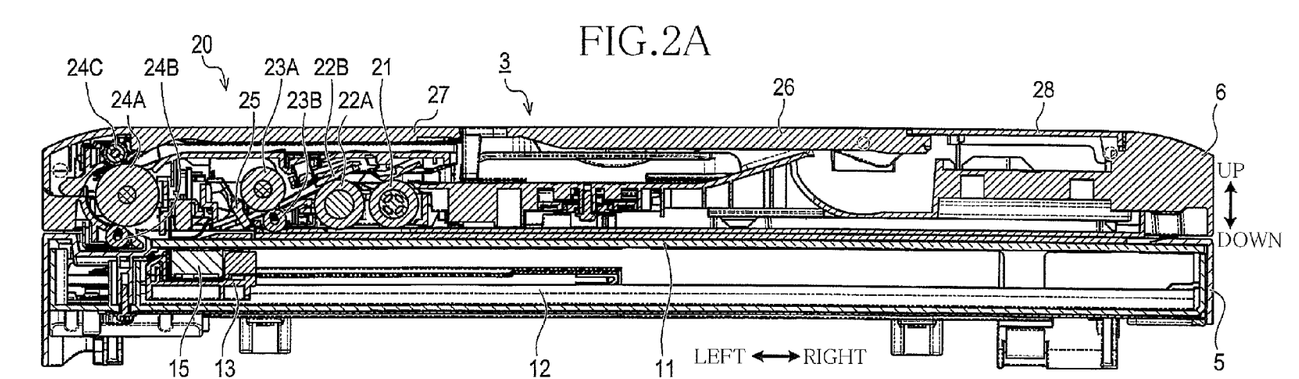
FIG. 2A is a central cross-sectional view showing a reading unit whose central cover is located at a closed position and FIG. 2B is a central cross-sectional view showing the reading unit whose central cover is located at an open position.
Figure 2B:
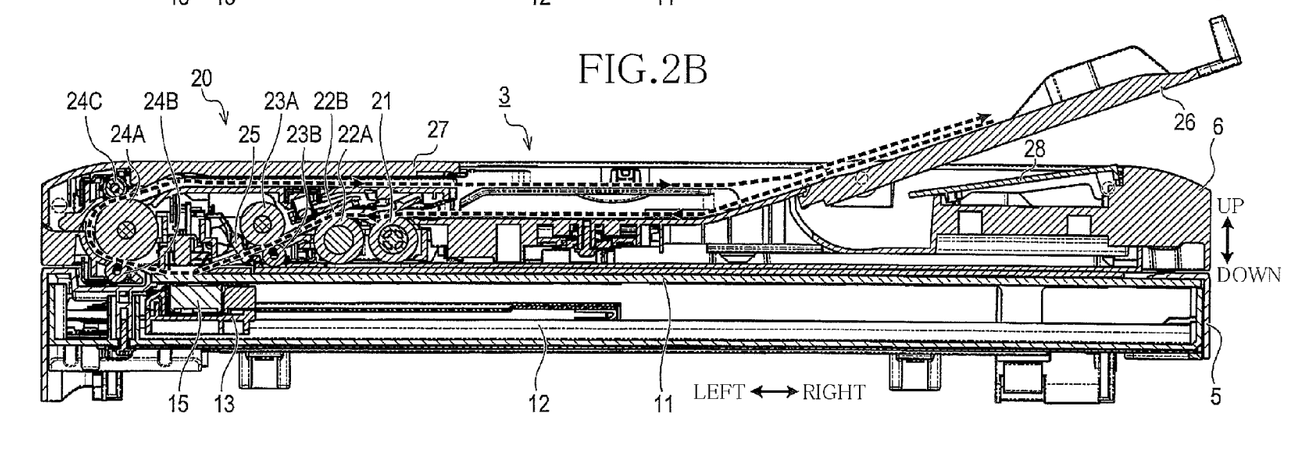

A shown in FIGS. 2A and 2B, the scanner unit 5 of the reading unit 3 includes a platen 11, a guide rail 12, a carriage 13, and an image sensor 15. A conveying unit 20 is disposed in the ADF unit 6 of the reading unit 3. The conveying unit 20 is configured to convey a sheet along a predetermined conveyance path indicated by a broken line in FIG. 2B. The carriage 13 and the image sensor 15 are configured to be reciprocated in the right-left direction in FIGS. 2A and 2B by power transmitted from a motor 35 (FIG. 3).

The conveying unit 20 includes a supply roller 21, a separation roller 22A, a separation piece 22B, a relay roller 23A, a relay pinch roller 23B, an inverting roller 24A, a first inverting pinch roller 24B, and a second inverting pinch roller 24C. The supply roller 21, the separation roller 22A, the relay roller 23A, and the inverting roller 24A are drivingly rotated by power transmitted from a motor 36 (FIG. 3). A sheet detecting sensor 25 is disposed at a position downstream of the relay roller 23A in a sheet conveyance direction. The sheet detecting sensor 25 is configured to be switched between on and off at a time point when a leading edge or a trailing edge of the sheet passes through the position.

The ADF unit 6 includes a central cover 26, a left cover 27, and a right cover 28. The central cover 26, the left cover 27, and the right cover 28 are pivotally supported by the ADF unit 6. In a state in which the central cover 26, the left cover 27, and the right cover 28 are located at respective positions shown in FIG. 2A, the covers 26-28 form an upper exterior of the ADF unit 6. When the central cover 26 is moved to a position shown in FIG. 2B, the central cover 26 functions as a supporter for supporting the sheets to be supplied to the conveying unit 20.

Figure 3:
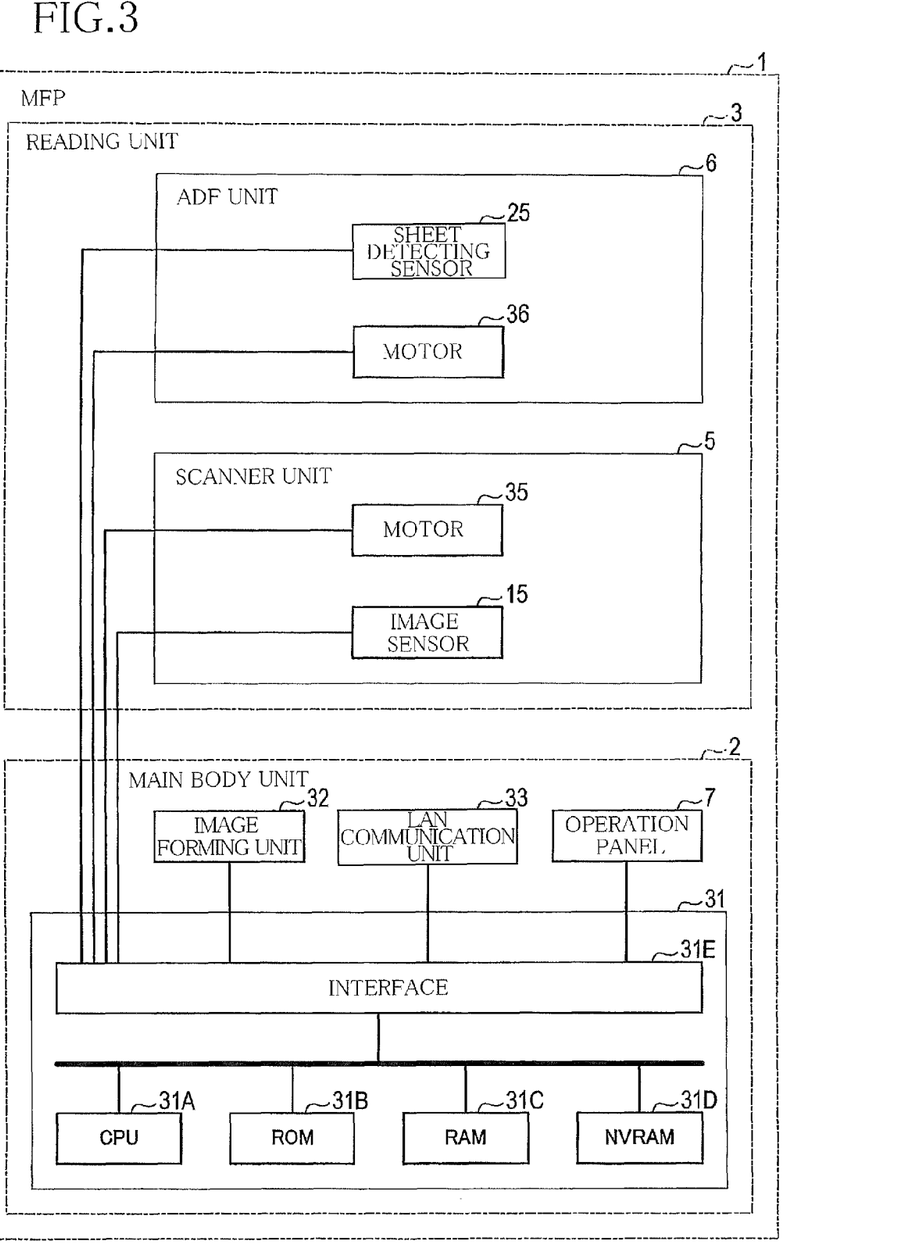
FIG. 3 is a block diagram showing a configuration of the MFP.

As shown in FIG. 3, a controller 31 is provided in the main body unit 2. The controller 31 includes a CPU 31A, a ROM 31B, a RAM 31C, an NVRAM 31D, and an interface 31E. The CPU 31A executes processing according to control programs stored in the ROM 31B and the RAM 31C, whereby components and devices of the MFP 1 are controlled.

The components and the devices controlled by the controller 31 include an image forming unit 32, a LAN communication unit 33, the motor 35, and the motor 36, in addition to the operation panel 7, the image sensor 15, and the sheet detecting sensor 25 described above. The image forming unit 32, the LAN communication unit 33, and the operation panel 7 are provided in the main body unit 2. The image sensor 15 and the motor 35 are provided in the scanner unit 5. The sheet detecting sensor 25 and the motor 36 are provided in the ADF unit 6.

The image forming unit 32 is capable of forming an image, by an ink jet method or an electrophotographic method, on a recording medium supplied from the medium supply cassette 9. The LAN communication unit 33 includes a communication interface device for a wireless LAN and a communication interface device for wired LAN. The motor 35 is a power source for reciprocating the carriage 13 and the image sensor 15. The motor 36 is a power source for operating the conveying unit 20. Each motor 35, 36 is a stepping motor.

2. Temperature-Dependent Motor Control

Figure 4:
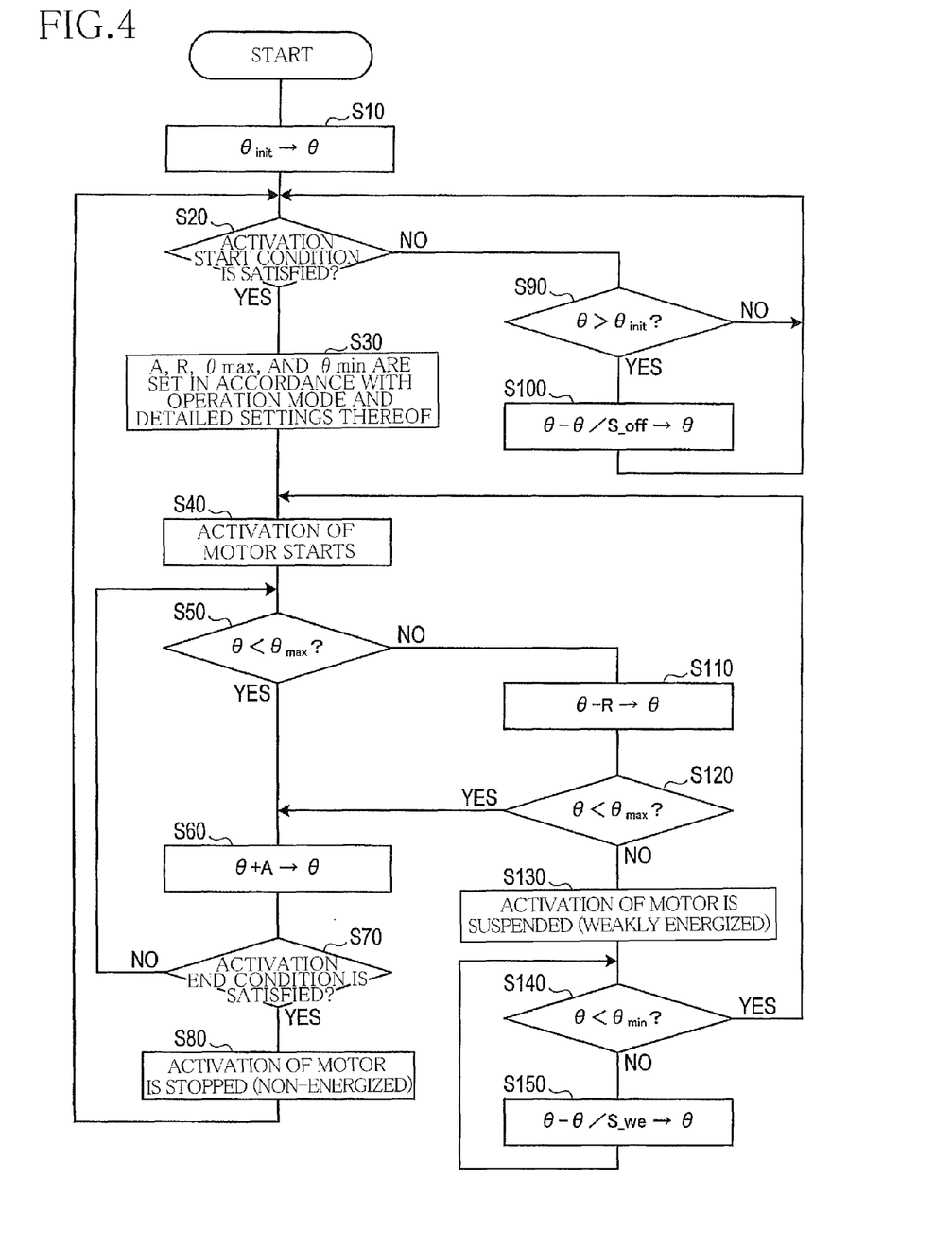
FIG. 4 is a flow chart of temperature-dependent motor control.

Referring next to FIG. 4, there will be explained temperature-dependent control of the motor 36 (hereinafter referred to as "temperature-dependent motor control" where appropriate) executed by the CPU 31A of the controller 31 of the MFP 1. The CPU 31A functions as a motor controller and a temperature estimator by execution of the temperature-dependent motor control. The temperature-dependent motor control starts when a power switch (not shown) of the MFP 1 is turned on and is thereafter repeatedly executed until the power switch is turned off.

When the temperature-dependent motor control starts, the CPU 31A sets an initial value θinit for an estimated value θ of a temperature of the motor 36 (hereinafter simply referred to as "estimated value θ" where appropriate)(S10). The estimated value θ is a variable indicative of a value corresponding to a temperature of the motor 36 estimated in the CPU 31A. The estimated value θ may be any value which is a relative value with respect to the initial value θinit and which can represent a degree of a temperature rise of the motor 36. The estimated value θ may be a value which does not match a numerical value that represents the temperature of the motor 36 in the ordinarily used unit of temperature (e.g., "° C." and "K"). While the initial value θinit is 0 in the present embodiment, this does not mean 0° C. or 0K. In an instance where the MFP 1 has a sensor or the like capable of measuring an actual room temperature, however, a value measured by the sensor or the like may be used as the initial value θinit.

The CPU 31A subsequently determines whether an activation start condition for starting activation of the motor 36 is satisfied (S20). The CPU 31A determines that the activation start condition is satisfied (S20: YES) when the following items are all satisfied, for instance: the sheets to be conveyed are set in the ADF unit 6; execution of a job such as scanning, copying, or facsimile transmission is instructed by an input operation through the operation panel 7 or an input operation in an external device, such as a personal computer (PC) not shown, communicable with the MFP 1; another job that hinders execution of the instructed job is not being executed; components of the MFP 1 are in a state in which the components do not hinder execution of the instructed job (e.g., a portion that should be locked is not in an unlocked state); and no errors are occurring in hardware or the like. When even one of the plurality of items is not satisfied, the CPU 31A determines that the activation start condition is not yet satisfied (S20: NO).

When the CPU 31A determines at S20 that the activation start condition is satisfied (S20: YES), the CPU 31A switches the control state of the motor 36 from the activation stopped state to the activated state. For this end, the CPU 31A sets an incremental constant A, a correction constant R, an upper limit value $\theta$max, and a lower limit value $\theta$min in accordance with an operation mode and its detailed settings (S30). Hereinafter, the operation mode and its detailed settings are collectively referred to as "operation-mode related settings" where appropriate.

The incremental constant A is a value set in advance with consideration given to a change in the temperature of the motor 36 caused when the motor 36 is activated according to an operating condition. The incremental constant A is a value that changes in accordance with an estimated rate of increase in the temperature. The correction constant R is a value set for making fine adjustments of conditions for determining whether the control state of the motor 36 is switched from the activated state to the activation suspended state, according to characteristics of an actual machine. The upper limit value $\theta$max is a threshold value (as one example of a first threshold) for determining whether the estimated value $\theta$ has become equal to or larger than an upper limit. The lower limit value $\theta$min is a threshold value (as one example of a second threshold) for determining whether the estimated value $\theta$ has become equal to or smaller than a lower limit. The correction constant R and the upper limit value $\theta$max are used when determining whether the control state of the motor 36 is switched from the activated state to the activation suspended state. The lower limit value $\theta$min is used when determining whether the control state of the motor 36 is switched from the activation suspended state to the activated state.

The incremental constant A, the correction constant R, the upper limit value $\theta$max, and the lower limit value $\theta$min are set in accordance with the operation-mode related settings. When the operation mode is a scan mode, the rotational speed of the motor 36 is higher in an instance where monochrome scanning at a resolution of 300 dpi is set than in an instance where color scanning at a resolution of 600 dpi is set. When the motor 36 is driven at a lower speed, an amount of heat generation of the motor 36 per one sheet becomes larger. Consequently, the incremental constant A and the correction constant R are set so as to be larger in 600 dpi color scanning than in 300 dpi monochrome scanning. Thus, the values A, R, $\theta$max, and $\theta$min are set in accordance with the operation-mode related settings.

When the image forming unit 32 is operated (e.g., when the operation mode is a copy mode), the ambient temperature of the motor 36 rises due to heat generation in the image forming unit 32. In such a case, the upper limit value $\theta$max is set so as to be smaller when the image forming unit 32 is operated than when the image forming unit 32 is not operated (e.g., when the operation mode is the scan mode). Consequently, the estimated value $\theta$ reaches the upper limit value $\theta$max faster when the image forming unit 32 is operated than when the image forming unit 32 is not operated, making it possible to obviate a temperature rise of the motor 36.

As described above, optimum values of the incremental constant A, the correction constant R, the upper limit value $\theta$max, and the lower limit value $\theta$min are set in accordance with the operation-mode related settings. The values A, R, $\theta$max, and $\theta$min are prepared for each of a plurality of sets of the operation-mode related settings on the basis of actual measurement in the actual machine and are stored in the ROM 31B. At S30, the values corresponding to the operation-mode related settings that are currently set are read out from the ROM 31B, and the read values are set as the incremental constant A, the correction constant R, the upper limit value $\theta$max, and the lower limit value $\theta$min to be used in subsequent processing.

The CPU 31A then starts activation of the motor 36 (S40) by a current (as one example of a first current) supplied to the motor 36, so that conveyance of the sheet starts in the ADF unit 6. The CPU 31A determines whether the estimated value $\theta$ is less than the upper limit value $\theta$max (S50). In an instance where the CPU 31A determines at S50 that the estimated value $\theta$ is less than the upper limit value $\theta$max (S50: YES), it is estimated that the temperature of the motor 36 does not yet reach the upper limit value, and the motor 36 is kept activated. That is, the operations in the ADF unit 6 such as conveyance and reading of the sheets are executed.

The CPU 31A subsequently performs a calculation $\theta+A\rightarrow\theta$ (as one example of a first calculation) in which a value $\theta+A$ obtained by adding the incremental constant A to the estimated value $\theta$ is set to a new estimated value $\theta$ (S60). Thus, there is added, to the estimated value $\theta$, a value corresponding to a temperature rise due to the activation of the motor 36.

The CPU 31A then determines whether an activation end condition for ending activation of the motor 36 is satisfied (S70). The CPU 31A determines that the activation end condition is satisfied (S70: YES) when any one of the following items is satisfied, for instance: the sheet detecting sensor 25 detects no more sheets as a result of conveyance of all sheets in the ADF unit 6; errors such as a paper jam have occurred; and errors have occurred in hardware or the like. When none of these items are satisfied, the CPU 31A determines that the activation end condition is not yet satisfied (S70: NO).

When the CPU 31A determines at S70 that the activation end condition is not satisfied (S70: NO), the control flow goes back to S50. Thereafter, the CPU 31A repeatedly implements steps S50-S70 as long as the estimated value $\theta$ is less than the upper limit value $\theta$max (S50: YES) and the activation end condition is not satisfied (S70: NO). Thus, in a time period during which the motor 36 is in the activated state, namely, while the motor 36 is being activated and the ADF unit 6 is being operated, the incremental constant A is added to the estimated value $\theta$ every time the motor 36 is activated by a predetermined amount, e.g., by a predetermined time or a predetermined number of revolutions (S60). As a result, the estimated value $\theta$ is updated so as to reflect a temperature rise of the motor 36. Wait processing (not shown) with a predetermined time is executed before or after S60, whereby a cycle at which processing of S50-S70 is repeated is adjusted. The cycle at which processing of S50-S70 is repeated is optimized based on a balance between the load that acts on the CPU 31A and the calculation accuracy of the estimated value θ.

When the CPU 31A determines at S70 that the activation end condition is satisfied (S70: YES), the CPU 31A switches the control state of the motor 36 from the activated state to the activation stopped state. For this end, the CPU 31A stops the motor 36 (S80). At S80, the current supply to the motor 36 is stopped, so that the motor 36 is placed in the non-energized state. After S80, the control flow returns to S20. Consequently, the CPU 31A again determines whether the activation start condition is satisfied (S20). When the activation start condition is satisfied (S20: YES), the CPU 31A switches the control state of the motor 36 from the activation stopped state to the activated state as explained above and executes processing of S30 and subsequent steps.

On the other hand, when the CPU 31A determines at S20 that the activation start condition is not yet satisfied (S20: NO), the control state of the motor 36 is kept in the activation stopped state. In this instance, the CPU 31A determines whether the estimated value θ is larger than the initial value θinit (S90). When the CPU 31A determines at S90 that the estimated value θ is larger than the initial value θinit (S90: YES), the CPU 31A performs a calculation θ−θ/S_off→θ (as one example of a second calculation) in which a quotient θ/S_off obtained by dividing the estimated value θ by a first decremental constant S_off is subtracted from the estimated value θ, so as to obtain a value θ−θ/S_off as a new estimated value θ (S100). That is, the estimated value θ is updated.

The first decremental constant S_off is set in advance with consideration given to a change in the temperature of the motor 36 caused when the current supply to the motor 36 is stopped, namely, the heat dissipation characteristics of the motor 36 in the non-energized state. The first decremental constant S_off is stored in the ROM 31B.

After S100, the control flow returns to S20. When the CPU 31A determines at S90 that the estimated value θ is equal to or smaller than the initial value θinit (S90: NO), the control flow returns to S20 without S100 being implemented. Thereafter, the CPU 31A repeatedly implements steps S20, S90, and S100 as long as the CPU 31A determines at S20 that the activation start condition is not yet satisfied (S20: NO). Thus, in a time period during which the motor 36 is in the activation stopped state, namely, while the motor 36 is stopped, S100 is repeatedly implemented as long as the estimated value θ is larger than the initial value θinit (S90: YES). As a result, the estimated value θ is updated so as to reflect a temperature drop of the motor 36 resulting from a lapse of time during which the motor 36 has not been activated. Wait processing (not shown) with a predetermined time is executed before or after S100, whereby a cycle at which processing of S20, S90, and S100 is repeated is adjusted. The cycle at which processing of S20, S90, and S100 is repeated is optimized based on a balance between the load that acts on the CPU 31A and the calculation accuracy of the estimated value θ.

In the processing explained above, the estimated value θ sometimes exceeds the upper limit value θmax during activation of the motor 36 as a result of repeated implementation of S60. In such a case, it is determined at S50 that the estimated value θ is equal to or larger than the upper limit value θmax (S50: NO), and the CPU 31A performs a calculation θ−R→θ in which a value θ−R obtained by subtracting the correction constant R from the estimated value θ is set to a new estimated value θ (S110). Then CPU 31A again determines whether the estimated value θ is less than the upper limit value θmax (S120).

When it is determined at S120 that the estimated value θ is less than the upper limit value θmax (S120: YES), the control flow returns to S60. Consequently, even when it is determined at S50 that the estimated value θ is equal to or larger than the upper limit value θmax, the control state returns to a state in which steps S50-S70 are repeatedly implemented. According to the processing, in an instance where it turns out that there exists some deviation between the estimated value θ and an actual temperature of the motor 36 from a measurement result of the actual temperature of the motor 36 in the actual machine, it is possible to prevent the control flow from immediately going to S130 and subsequent steps by setting the correction constant R in accordance with the deviation. In an instance where there exists no deviation between the estimated value θ and the actual temperature of the motor 36, the correction constant R may be set to 0.

On the other hand, when it is determined at S120 that the estimated value θ is equal to or larger than the upper limit value θmax (S120: NO), the CPU 31A switches the control state of the motor 36 from the activated state to the activation suspended state. For this end, the CPU 31A suspends activation of the motor 36 (S130). At S130, a weak current (as one example of a second current) is supplied to the motor 36, so that the motor 36 is placed in a weakly energized state. S130 differs in this point from S80 in which the current supply to the motor 36 is completely stopped.

According to the control described above, even if the sheet being conveyed is present in the conveying unit 20 at a time point of implementation of S130 and tension generated in the sheet acts on rollers or the like and is transmitted to the motor 36, it is possible to prevent a rotor of the motor 36 from being rotated by the tension, thereby preventing an occurrence of a phase shift of the motor 36. It is further possible to prevent a loss of synchronization of the motor 36 from being caused due to such a phase shift when the motor 36 is re-activated.

The CPU 31A subsequently determines whether the estimated value θ is less than the lower limit value θmin (S140). When it is determined at S140 that the estimated value θ is equal to or larger than the lower limit value θmin (S140: NO), the CPU 31A performs a calculation θ−θ/S_we→θ (as one example of a third calculation) in which a quotient θ/S_we obtained by dividing the estimated value θ by a second decremental constant S_we is subtracted from the estimated value θ, so as to obtain a value θ−θ/S_we as a new estimated value θ (S150). That is, the estimated value θ is updated.

The second decremental constant S_we is a value set in advance with consideration given to a change in the temperature of the motor 36 caused when a weak current is supplied to the motor 36 and the motor 36 is accordingly placed in the weakly energized state, namely, the heat dissipation characteristics of the motor 36 in the weakly energized state. The second decremental constant S_we is stored in the ROM 31B. When the motor 36 is the weakly energized state, the motor 36 somewhat generates a heat, unlike when the motor 36 is in the non-energized state. In view of this, the second decremental constant S_we is set to be larger than the first decremental constant S_off.

After S150, the control flow returns to S140. Thereafter, the CPU 31A repeatedly implements steps S140-S150 as long as the estimated value θ remains equal to or larger than the lower limit value θmin at S140 (S140: NO). Thus, in a time period during which the motor 36 is in the activation suspended state, namely, the motor 36 is in the weakly energized state so that the activation of the motor 36 is accordingly suspended, steps S140-S150 are repeatedly implemented as long as the estimated value θ remains equal to or larger than the lower limit value θmin (S140: NO). As a result, the estimated value θ is updated so as to reflect a temperature drop of the motor 36. Wait processing (not shown) with a predetermined time is executed before or after S150, whereby a cycle at which processing of S140-S150 is repeated is adjusted. The cycle at which processing of S140-S150 is repeated is optimized based on a balance between the load that acts on the CPU 31A and the calculation accuracy of the estimated value θ.

On the other hand, when the estimated value θ becomes less than the lower limit value θmin at S140 (S140: YES) as a result of repeated implementation of S150, the control flow returns to S40. Thus, the CPU 31A switches the control state of the motor 36 from the activation suspended state to the activated state.

3. Advantageous Effects

According to the motor control device constructed as described above, the CPU 31A switches the control state of the motor 36 among the activated state, the activation stopped state, and the activation suspended state, depending upon the situations described above. Consequently, the CPU 31A switches the control state of the motor 36 to the activation suspended state in a situation in which the motor will suffer from problems of the shift phase and the loss of synchronization if the control state is switched to the activated state after having been switched to the activation stopped state. It is thus possible to prevent an occurrence of the problems of the shift phase and the loss of synchronization.

The CPU 31A switches the control state of the motor 36 to the activation stopped state in a situation in which switching to the activation stopped state will cause no problems, so that consumption of the electric power in the MFP 1 can be made smaller, as compared with when the control state is switched to the activation suspended state.

The CPU 31A performs the first calculation, the second calculation, and the third calculation explained above, depending upon the control state of the motor 36. It is thus possible to obtain the estimated value of the motor temperature with higher accuracy, as compared with a conventional method of estimating the motor temperature in which the estimated value θ is gradually decreased with time irrespective of whether the control state is the activation stopped state or the activation suspended state. Consequently, the present motor control device can execute appropriate control based on the accurate estimated value while taking the temperature of the motor 36 into consideration. Thus, the stop time during which the motor is kept stopped in association with the temperature-dependent motor control can be made appropriate, so that the motor control device has good operability for users.

Modifications

While the embodiment of has been explained above, it is to be understood that the disclosure is not limited to the details of the illustrated embodiment, but may be embodied with various other changes and modifications, which may occur to those skilled in the art, without departing from the scope of the disclosure.

In the illustrated embodiment, the temperature-dependent motor control is executed for the motor 36 provided in the ADF unit 6. Similar temperature-dependent motor control may be executed for the motor 35 provided in the scanner unit 5. That is, the motor control device may be incorporated in the sheet conveying device or in a device other than the sheet conveying device such as a flatbed image reading device.

While the calculation methods are concretely described for the first calculation, the second calculation, and the third calculation in the illustrated embodiment, mathematical expressions other than those described above may be used as long as mathematical expressions can approximately express a temperature rise or drop of the motor 36.

Supplemental Explanation

It can be understood that the motor control device and the sheet conveying device explained above may have the following configurations based on the illustrated embodiment.

In the motor control device and the sheet conveying device, the motor controller is configured: to switch the control state of the motor to the activated state when an activation start condition is satisfied; to switch the control state of the motor to the activation stopped state when an activation end condition is satisfied. The motor controller may be configured to switch, during a time period in which the activation end condition is not yet satisfied after satisfaction of the activation start condition, the control state of the motor to the activation suspended state when the estimated value becomes larger than a first threshold and to switch the control state again to the activated state when the estimated value becomes smaller than a second threshold as a result of switching to the activation suspended state.

In the thus constructed motor control device, when the estimated value of the temperature of the motor becomes larger than the first threshold in the time period during which the activation end condition is not yet satisfied after satisfaction of the activation start condition, the motor controller switches the control state to the activation suspended state. When the estimated value becomes smaller than the second threshold as a result of switching to the activation suspended state, the motor controller switches the control state again to the activated state. Unlike a motor controller configured to switch the control state to the activation stopped state due to a temperature rise of the motor even though the activation end condition is not yet satisfied, the present motor controller is free from problems such as the loss of synchronization of the motor when the control state is switched again to the activated state.

In the motor control device and the sheet conveying device, the temperature estimator may be configured such that, in the time period during which the motor is in the activated state, the temperature estimator performs, as the first calculation, a calculation in which an incremental constant is added to the estimated value so as to update the estimated value every time the motor is activated by a predetermined amount, the incremental constant being set in advance with consideration given to a change in the temperature of the motor caused when the motor is activated according to the operating condition.

In the motor control device and the sheet conveying device, the temperature estimator may be configured such that, in the time period during which the motor is in the activation stopped state, the temperature estimator performs, as the second calculation, a calculation in which a quotient obtained by dividing the estimated value by a first decremental constant is subtracted from the estimated value so as to update the estimated value every time a predetermined time elapses, the first decremental constant being set in advance with consideration given to a change in the temperature of the motor caused when the current is stopped from being supplied to the motor.

In the motor control device and the sheet conveying device, the temperature estimator may be configured such that, in the time period during which the motor is in the activation suspended state, the temperature estimator performs, as the third calculation, a calculation in which a quotient obtained by dividing the estimated value by a second decremental constant is subtracted from the estimated value so as to update the estimated value every time the predetermined time elapses, the second decremental constant being set in advance with consideration given to a change in the temperature of the motor caused when the second current is supplied to the motor, and the second decremental constant is larger than the first decremental constant.

In the motor control device and the sheet conveying device, the temperature estimator may be configured such that, when the temperature estimator performs the first calculation, a rate of increase in the estimated value increases with a decrease in a rotational speed of the motor.

According to the motor control device constructed as described above, the temperature of the motor can be appropriately estimated in the first calculation while considering the rotational speed of the motor.

What is claimed is:

1. A motor control device for controlling a motor in dependence on a temperature of the motor, comprising:
    a motor controller configured to switch a control state of the motor among a plurality of control states including at least (a) an activated state in which the motor is activated by supplying thereto a first current, (b) an activation stopped state in which activation of the motor is stopped by stopping a current from being supplied to the motor, and (c) an activation suspended state in which activation of the motor is suspended with a second current kept supplied to the motor, the second current being smaller than the first current; and
    a temperature estimator configured to calculate an estimated value of the temperature of the motor that changes with time,
    wherein the temperature estimator is configured to perform
        (1) a first calculation for gradually increasing the estimated value with time in a time period during which the motor is in the activated state,
        (2) a second calculation for gradually decreasing the estimated value with time in a time period during which the motor is in the activation stopped state, and
        (3) a third calculation for gradually decreasing the estimated value with time at a rate of decrease lower than that in the second calculation in a time period during which the motor is in the activation suspended state.

2. The motor control device according to claim 1,
    wherein the motor controller is configured:
        to switch the control state of the motor to the activated state when an activation start condition is satisfied;
        to switch the control state of the motor to the activation stopped state when an activation end condition is satisfied; and
        in a time period during which the activation end condition is not yet satisfied after satisfaction of the activation start condition, to switch the control state of the motor to the activation suspended state when the estimated value becomes larger than a first threshold and to switch the control state again to the activated state when the estimated value becomes smaller than a second threshold as a result of switching to the activation suspended state.

3. The motor control device according to claim 1, wherein the temperature estimator is configured such that, in the time period during which the motor is in the activated state, the temperature estimator performs, as the first calculation, a calculation in which an incremental constant is added to the estimated value so as to update the estimated value every time the motor is activated by a predetermined amount, the incremental constant being set in advance with consideration given to a change in the temperature of the motor caused when the motor is activated by the first current supplied thereto.

4. The motor control device according to claim 1, wherein the temperature estimator is configured such that, in the time period during which the motor is in the activation stopped state, the temperature estimator performs, as the second calculation, a calculation in which a quotient obtained by dividing the estimated value by a first decremental constant is subtracted from the estimated value so as to update the estimated value every time a predetermined time elapses, the first decremental constant being set in advance with consideration given to a change in the temperature of the motor caused when the current is stopped from being supplied to the motor.

5. The motor control device according to claim 4,
    wherein the temperature estimator is configured such that, in the time period during which the motor is in the activation suspended state, the temperature estimator performs, as the third calculation, a calculation in which a quotient obtained by dividing the estimated value by a second decremental constant is subtracted from the estimated value so as to update the estimated value every time the predetermined time elapses, the second decremental constant being set in advance with consideration given to a change in the temperature of the motor caused when the second current is supplied to the motor, and
    wherein the second decremental constant is larger than the first decremental constant.

6. The motor control device according to claim 1, wherein the temperature estimator is configured such that, when the temperature estimator performs the first calculation, a rate of increase in the estimated value increases with a decrease in a rotational speed of the motor.

7. A sheet conveying device, comprising:
    a conveying unit configured to convey a sheet along a conveyance path;
    a motor configured to operate the conveying unit;
    a motor controller configured to switch a control state of the motor among a plurality of control states including at least (a) an activated state in which the motor is activated by supplying thereto a first current, (b) an activation stopped state in which activation of the motor is stopped by stopping a current from being supplied to the motor, and (c) an activation suspended state in which activation of the motor is suspended with a second current kept supplied to the motor, the second current being smaller than the first current; and
    a temperature estimator configured to calculate an estimated value of the temperature of the motor that changes with time,
    wherein the temperature estimator is configured to perform
        (1) a first calculation for gradually increasing the estimated value with time in a time period during which the motor is in the activated state, (2) a second calculation for gradually decreasing the estimated value with time in a time period during which the motor is in the activation stopped state, and
(3) a third calculation for gradually decreasing the estimated value with time at a rate of decrease lower than that in the second calculation in a time period during which the motor is in the activation suspended state.

\* \* \* \* \*